United States Patent
Lutz et al.

(10) Patent No.: US 7,064,831 B2
(45) Date of Patent: Jun. 20, 2006

(54) COLORIMETER WITH SINGLE CABLE LOW IMPACT MOUNTING SYSTEM

(75) Inventors: Carl D Lutz, Auburn, NH (US);
Thomas A Lianza, Bedford, NH (US);
Nicholas A Milley, Andover, MA (US)

(73) Assignee: Gretagmacbeth, LLC, New Windsor, NY (US)

( * ) Notice: Subject to any disclaimer, the term of this patent is extended or adjusted under 35 U.S.C. 154(b) by 365 days.

(21) Appl. No.: 10/684,854

(22) Filed: Oct. 14, 2003

(65) Prior Publication Data

US 2004/0080749 A1    Apr. 29, 2004

Related U.S. Application Data

(60) Provisional application No. 60/444,256, filed on Feb. 3, 2003, provisional application No. 60/432,203, filed on Dec. 11, 2002, provisional application No. 60/418,308, filed on Oct. 15, 2002.

(51) Int. Cl.
*G01J 3/51* (2006.01)

(52) U.S. Cl. .................. 356/405; 356/419; 348/191

(58) Field of Classification Search ................ 356/405, 356/406, 416, 419; 348/191
See application file for complete search history.

(56) References Cited

U.S. PATENT DOCUMENTS

| | | | |
|---|---|---|---|
| 5,257,097 A | 10/1993 | Pineau et al. | |
| 5,270,540 A | 12/1993 | Skop, Jr. et al. | |
| 5,363,318 A | 11/1994 | McCauley | |
| 5,739,809 A | 4/1998 | McLaughlin et al. | |
| 5,892,585 A | 4/1999 | Lianza et al. | |
| D419,465 S | 1/2000 | Meng et al. | |
| 6,067,166 A | 5/2000 | Fox et al. | |
| 6,139,005 A | 10/2000 | Nelson et al. | |
| 6,163,377 A | 12/2000 | Boles et al. | |
| 6,260,842 B1 | 7/2001 | Nelson et al. | |
| 6,320,652 B1 | 11/2001 | Morimoto et al. | |
| 6,459,425 B1 | 10/2002 | Holub et al. | |
| 6,459,485 B1 | 10/2002 | Tsurutani | |
| 6,611,249 B1 * | 8/2003 | Evanicky et al. | ........... 345/102 |
| 2003/0058202 A1 | 3/2003 | Evanicky et al. | |
| 2003/0058448 A1 | 3/2003 | Merle et al. | |

OTHER PUBLICATIONS

"Monaco OPTIX", 2002, pp. 1-2, Monaco Systems, Inc., Andover, MA.
"Monaco Systems, Inc.—Color Management", http://www.monacosys.com/, 2002, p. 1, Monaco Systems, Inc., Andover MA.

(Continued)

*Primary Examiner*—F. L. Evans
(74) *Attorney, Agent, or Firm*—Maine & Asmus

(57) ABSTRACT

A colorimeter that uses its flexible power/electronic cable as a mounting mechanism is disclosed. The colorimeter can be placed against a target screen, suspended by the cable, where the cable in turn drapes over the top of the display cabinet. A slidable weight can be coupled to the cable to hold a selected position. Alternatively, a slotted suction cup can be used to hold the selected position. A leaf spring can be installed to provide a slight bias force to the backside of the colorimeter, thereby ensuring the colorimeter lays flush to the target screen in the presence of disruptive conditions and anomalies. The colorimeter can further be configured with a low impact suction cup array mount. The colorimeter assembly can be configured with an FOV that corresponds to that of a human, and with self-aligning optical qualities that provide a colorimeter with high SNR.

36 Claims, 5 Drawing Sheets

OTHER PUBLICATIONS

"Eye-One", 2002, pp. 1-4, GretagMacbeth AG, Regensdorf, Swizterland.

"Eye-One", 2003, pp. 1-4, GretagMacbeth AG, Regensdorf, Switzerland.

"Monaco OPTIX", 2003, pp. 1-2, Monaco Systems, Inc., Andover, MA.

"Monacooptix with "Light Tunnel" Technology for Accurate LCD and CRT Display Profiling Now Available", http://www.monacosys.com/, 2002, p. 1, Monaco Systems, Inc., Andover MA.

Briot, A. "Calibrating & Profiling LCD Displays Using ColorBlind ProveIt", http://www.luminous-landscape.com/tutorials/acd-profile.shtml, pp. 1-7, 2002.

Rodney, A. "CMS Redux: Color Management System Hardware and Software Get More Sophisticated and Often, Easier to Use", PEI, Sep. 2000, pp. 22-28.

"NEC-Mitsubishi Electronics Displays Enhances Award Winning Line of CRT Monitors for Color Preference Users", www.necus.com/companies/17/Enhance_crt_color_users.htm, pp. 1-3, 2001.

"The Apple Cinema Display: Technology and Productivity", Pfeiffer Report-Benchmark Summary, 2000, pp. 1-6, Pfeiffer Consulting.

Color photograph from DRUPA Tradeshow, Germany, 2000.

"iProfile Bundle: One Big Package. One Small Price", GretagMacbeth, 2000.

"Spectrolino Spectrophotometer", GretagMacbeth, 1998.

Fraser, B. "The Color Challenge: Can Flat-Panel Displays Replace CRTs on Publisher's Desks?", MacWorld, www.macworld.com/2001/06/features/color, Jun. 2001.

"Spyder: Professional Quality On-Screen Color", 2003, ColorVision, Inc., Lawrenceville, NJ.

Lyons, I., "Monitor Calibration & Profiling: PhotoCAL and OptiCal" Computer-Darkroom, http://www.computer-darkroom.com/photocal/photocal_1.htm, Dec. 7, 2002.

* cited by examiner

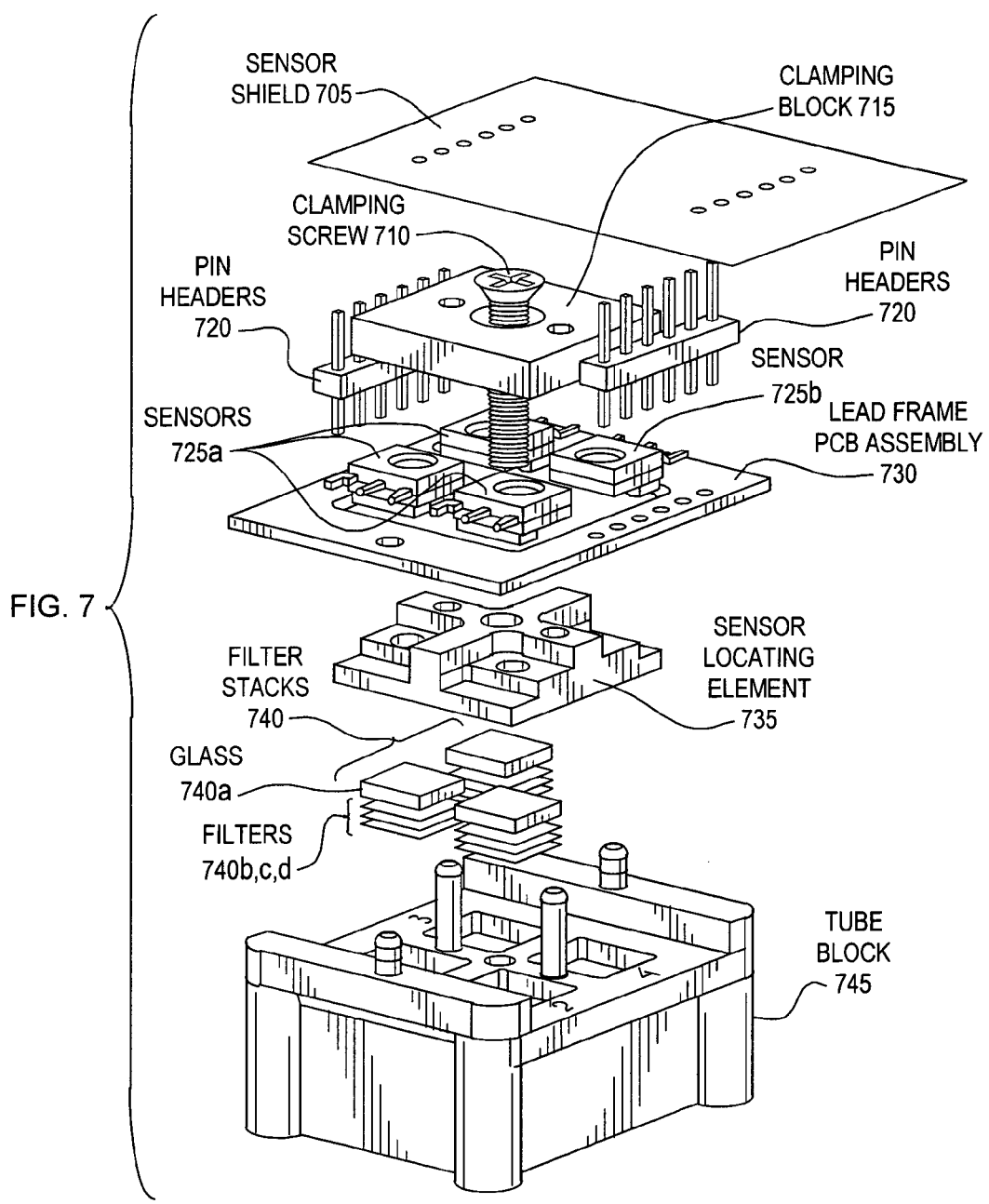

COLORIMETER WITH SINGLE CABLE LOW IMPACT MOUNTING SYSTEM

RELATED APPLICATIONS

This application claims the benefit of U.S. Provisional Application Nos. 60/418,308, filed 15 Oct. 2002, and 60/444,256, filed 3 Feb. 2003, and 60/432,203, filed 11 Dec. 2002. Each of these applications is herein incorporated in its entirety by reference. In addition, this application is related to U.S. application Ser. No. 10/684,864, filed Oct. 14, 2003, titled "Colorimeter with High SNR", and to U.S. application Ser. No. 10/684,853, filed Oct. 14, 2003, titled "Sensor with Suction Cup Array Mount". Each of these applications is herein incorporated in its entirety by reference.

FIELD OF THE INVENTION

The invention relates to colorimeters, and more particularly, to a colorimeter configured with a single cable, low impact mounting system.

BACKGROUND OF THE INVENTION

Colorimeters are devices for measuring the spectral content of light, where the measured light can be emitted either directly or indirectly from a given source. Recent developments have produced designs resulting in low cost colorimeters with performance characteristics approaching or exceeding professional quality required by the standards. One such colorimeter design is described in detail in U.S. Pat. No. 5,892,585, which is herein incorporated by reference in its entirety. With such cost effective, high-performance colorimeter designs available, a need has arisen for techniques for effectively mounting the colorimeter to the device being measured. In more detail, the physical factors relating to mounting a colorimeter to a target device present a number of non-trivial problems.

For instance, it is necessary to ensure that the forces of attachment are minimized to reduce pressure applied to a computer having a liquid crystal display (LCD). Otherwise, color distortion will occur. Also, LCD screens are particularly sensitive to the distribution and magnitude of the mounting forces. Thus, it is desirable that the colorimeter be relatively easy to position and attach to the target device. In addition, it is necessary to shield the measuring system from extraneous light (light from sources other than the target device being measured), which will otherwise reduce the signal-to-noise (SNR) ratio of the colorimeter system.

Conventional colorimeter designs employ a strap or hanging apparatus for securing or otherwise suspending the colorimeter in front of a display screen. A donut-shaped foam pad or similar soft pad is used to keep the colorimeter from pressing too hard on the screen so as to prevent color distortion. However, such designs are cumbersome to use due to the nature of the strap or hanging apparatus, and generally provide a significant impediment to simple user operation. In addition to the strap or hanging apparatus, such devices further require an electrical cable for carrying signals between the colorimeter and the host, which further contributes to area clutter and the cumbersome nature of such conventional designs. Moreover, such designs may not operate to maximize the SNR of the colorimeter device, particularly those designs where the colorimeter's peripheral field of view is not limited.

One such conventional colorimeter mounting design is described in U.S. patent application Ser. No. 10/251,426. In addition to an electrical cable for carrying signals between the colorimeter and the host, this particular design employs a mounting scheme having a suspension means to suspend the colorimeter in front of the monitor. The suspension means can be flexible (e.g., rubber tubing) or rigid (e.g., plastic). One end of the suspension means connects to the colorimeter, while the other end is connected to a counterweight.

Once the desired colorimeter position is achieved, the suspension means is secured into position by pressing it into slotted fulcrum device secured on the monitor to be measured. This leaves the colorimeter device in front of the monitor screen, and the counterweight hanging behind the monitor. Note, however, that the additional electrical cable must be managed during this balancing and positioning process, and ultimately introduces various stresses and twisting forces on the assembly. Such extra considerations further complicate the balancing and positioning process.

Other conventional mounting designs employ one to four relatively large suction cups to hold the colorimeter in place. One such device uses a large annular suction cup fitted about a color sensor, where the sensor measures through the center. Another such design uses a large rubber suction cup with a rigid clear member through which a proximate sensor can measure. Another such embodiment employs four large suction cups, one at each corner of the sensing device. These suction cup methods each suffer from reliability issues.

For example, if the seal fails due to an imperfection in materials or a particle of dust or debris, then air will leak into the cavity causing suction cup failure. With just one suction cup, the device will simply fall off the target being measured. With the four cup-corner type design, the weight of the device will be unevenly distributed, thereby causing a shift in alignment of the device and/or the failure of the remaining seals. This problem is further exacerbated in that displays have a tendency to attract dust. Moreover, the suction cups used in such designs have a relatively large depth. As a result, a slow air leak will cause the screen-to-sensor distance to substantially increase, thereby adversely affecting device measurement accuracy.

What is needed, therefore, are improved techniques for positioning and mounting a colorimeter to a target screen.

BRIEF SUMMARY OF THE INVENTION

One embodiment of the present invention provides a screen mountable color sensing device for sensing light emitting from a target screen. The device includes a colorimeter configured with one or more light sensors, and a field of view between each sensor and the target screen that simulates a human eye field of view. A flexible cable is adapted to electrically connect the colorimeter to a host, and to suspend the colorimeter in a selected position on the target screen. A slidable weight is coupled to the cable and adapted to slide to a position on the cable so as to hold the colorimeter in the selected position on the target screen.

Another embodiment of the present invention provides a screen mountable color sensing device for sensing light emitting from a target screen. In this case, the device includes a colorimeter configured with one or more sensors, and a field of view between each sensor and the target screen that simulates a human eye field of view. A flexible cable is adapted to electrically connect the colorimeter to a host, and to suspend the colorimeter in a selected position on the target screen. The device further includes a suction cup that is adapted for deployment proximate the target screen, and to secure the flexible cable so as to hold the colorimeter in the selected position on the target screen.

Another embodiment of the present invention provides a screen mountable color sensing device for sensing light emitting from a target screen. In this particular case, the device includes a colorimeter having a target screen surface and a backside. A flexible cable is adapted to electrically connect the colorimeter to a host, and to suspend the colorimeter in a selected position on the target screen. The device further includes a suction cup that is adapted for deployment proximate the target screen, and to secure the flexible cable so as to hold the colorimeter in the selected position on the target screen. A leaf spring is operatively coupled between the suction cup and the colorimeter, and is adapted to provide a slight bias force to the backside of the colorimeter, thereby ensuring the target screen surface of the colorimeter lays flush to the target screen in the presence of disruptive conditions and anomalies.

Another embodiment of the present invention provides a screen mountable color sensing device for sensing light emitting from a target screen. In this particular case, the device includes a colorimeter having a target screen surface and a backside. A flexible cable is adapted to electrically connect the colorimeter to a host, and to suspend the colorimeter in a selected position on the target screen. A slidable weight is coupled to the cable and adapted to slide to a position on the cable so as to hold the colorimeter in the selected position on the target screen. This device further includes a leaf spring that is adapted to provide a slight bias force to the backside of the colorimeter, thereby ensuring the target screen surface of the colorimeter lays flush to the target screen in the presence of disruptive conditions and anomalies.

Each of these embodiments may include additional features and components, as will be apparent in light of this disclosure. Also, the various disclosed features and or components can be arranged in a number of combinations to exploit the benefits of each as so desired.

In one configuration, each of one or more light sensors included in the colorimeter is configured with a bubble shaped lens, and the colorimeter further includes a tube block having one or more filter cavities and corresponding light passages, and two or more alignment pins, thereby enabling a self-aligning fabrication process for the device. A sensor locating element is operatively coupled to the pins of the tube block, the sensor locating element having one or more lens alignment holes, where each hole is adapted to receive a corresponding one of the bubble shaped lenses, thereby aligning each sensor with a corresponding light passage of the tube block. Such an embodiment may further include one or more light filters, where each filter placed in a corresponding one of the filter cavities, thereby providing one or more spectrally selective channels. Each spectrally selective channel is designed to provide the field of view between each sensor and the target screen that simulates a human eye field of view. Note that the one or more spectrally selective channels can be configured as non-overlapping, overlapping, and/or to enable tri-stimulus measurements.

In another particular configuration, each of the one or more light sensors has a planar locating surface that mates with a surface about a corresponding one of the lens alignment holes of the sensor locating element, thereby aligning a plane of the target screen and a plane of the light sensors. In another particular configuration, the colorimeter further includes an array of suction cups that is adapted to hold the colorimeter in position on the target screen. Each cup in the array has a maximum displacement distance of 0.115 inches or less, thereby enabling positional stability of the colorimeter. Note that the maximum displacement distance defines a distance any one cup will move in transitioning from a fully engaged-state to a fully relaxed-state. In addition, one or more rigid stops are located on the array, so as to establish a pre-set distance of the colorimeter to the target screen. Each stop has a height that allows each of the suction cups in the array to be fully seated.

In such an embodiment, the array of suction cups may further include a sensor hole located in the array, so as to allow the colorimeter to receive light emitted from the target screen. In addition, a sensor shield is located about the sensor hole, and is adapted to shield the one or more light sensors from extraneous light generated by sources other than the target screen. The array of suction cups can be formed, for example, using injection molding techniques and then operatively coupled to the colorimeter. The colorimeter can have one or more weights placed within its body, thereby causing the colorimeter to lay flush against the target screen.

Thus, depending on the particular application, note that a color sensing device configured in accordance with the principles of the present invention can combine a number of features each providing certain benefits, as will be apparent in light of this disclosure. For instance, a suction cup that is adapted for deployment proximate the target screen can be used to secure the flexible cable so as to hold the colorimeter in the selected position on the target screen, or to secure the leaf spring, or both. The colorimeter components (e.g., tube block and sensor locator) can be configured so as to provide a field of view that simulates a human eye field of view, and with self-aligning qualities to provide a high SNR (relative to conventional colorimeters). A suction cup array can be provided that reliably maintains positional stability of the colorimeter, with low mounting/dismounting pressure.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 5b is a cross-section view of the suction cup array shown in FIG. 5a.

FIG. 7 is an exploded view of a colorimeter assembly having self-aligning optical qualities that yield a high SNR in accordance with one embodiment of the present invention.

Figure 1:
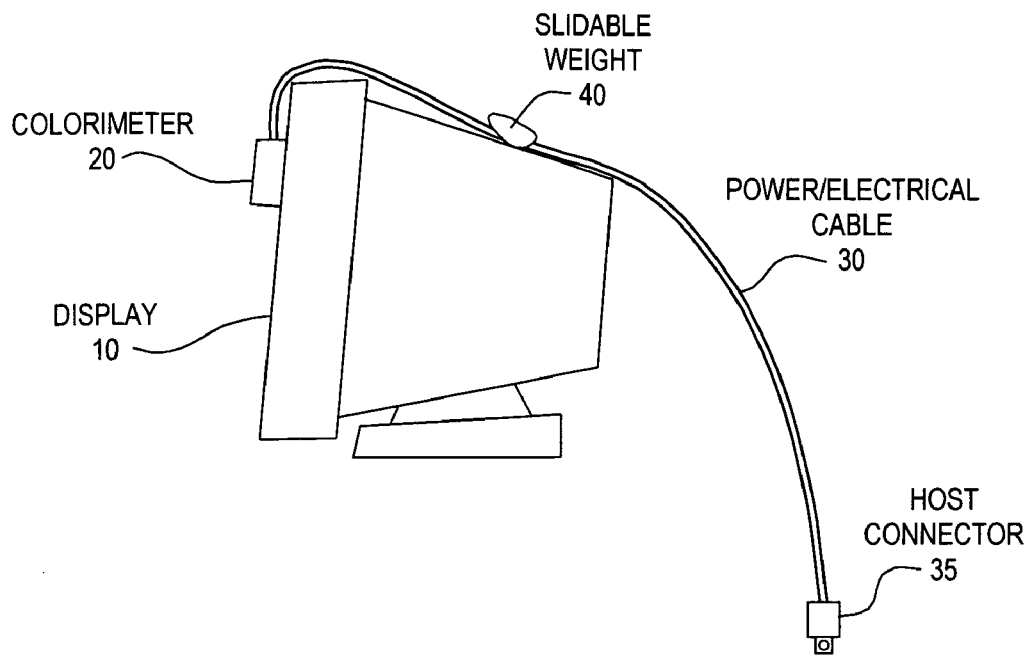
FIG. 1 is a side view of a colorimeter configured with a single cable, low impact mounting system in accordance with one embodiment of the present invention.

Note that the figures are presented to facilitate understanding and clarity of individual features, and are not necessarily drawn to scale.

DETAILED DESCRIPTION OF THE INVENTION

Embodiments of the present invention provide an improved mounting system for screen mounted colorimeters capable of measurement of emitted light from sources that are static such as LCD displays, illuminated printed or graphic matter, and/or temporally active types such as CRT displays or strobed printed and graphic matter. The disclosed techniques are particularly useful in addressing an LCD display's extreme sensitivity to external forces applied to the screen surface. A single flexible electrical cable is used to both suspend the colorimeter in position on the screen, and to carry electrical signals (e.g., power and control signals) between the colorimeter and its host. The flexible cable has a length that allows it to be draped over the target display, and to be coupled to a communication interface (e.g., USB port) of a host system. Various holding schemes can be employed to ensure the positioned cable and colorimeter assembly remain in the chosen position.

In one embodiment, a slidable weight on the cable can be adjusted as needed to properly support and hold the position of the suspended colorimeter. Alternatively, a suction cup configured with a cable groove can be used to support and hold position of the suspended colorimeter. In such an embodiment, after the colorimeter is positioned on the target screen, a leaf spring may be installed between the colorimeter and the suction cup to maximize the integrity of the mating of the colorimeter and the screen to maintain the proper geometric requirements. Alternatively, or in addition to, the weight distribution of the colorimeter body can be optimized or otherwise adjusted (by placing a weight(s) inside the colorimeter housing) to work in conjunction with the flexible cable so as to provide a bearing force that causes the colorimeter to lay flush on the target screen, thereby maintaining proper geometric requirements By employing a flexible electrical cable to drape the colorimeter over the top of a target display, additional cumbersome suspension mechanisms and their associated clutter are avoided. In addition, undesired attachment forces are significantly reduced or otherwise eliminated, leaving only the bearing force of the relatively lightweight colorimeter body suspended at near vertical position, resulting in a negligible force tangential to the screen.

The mounting system may be further configured to include a suction cup array that operates to hold the colorimeter in position on a target screen, while minimizing factors that result in change of mounting distance (colorimeter body to screen) over time, and minimizing and distributing mount forces so as to not damage the screen (or other target surface) during the mounting and dismounting of the colorimeter. Alternatively, or in addition to, the colorimeter assembly can be configured to maximize signal-to-noise ratio (SNR), as well as to provide an optimal field of view (FOV) that corresponds to or otherwise that simulates the human eye field of view. Geometric elements and features of the device design, in conjunction with the assembly procedure, assure precise alignment of optical elements including sensors, filters, and other elements within the enclosure and optical path.

Single Cable with Slidable Weight

FIG. 1 is a side view of a colorimeter configured with a single cable, low impact mounting system in accordance with one embodiment of the present invention. As can be seen, colorimeter 20 has been placed to measure light emitting from display 10. Electrical cable 30 electrically connects the colorimeter 20 to a host via the host connector 35. A slidable weight 40 is coupled to the cable 30, and can be slid into a position that allows the colorimeter 20 to hang in a desired position.

The display 10 can be, for example, a CRT, LCD, flat panel, television screen, or any other surface that emits light or color. Note that if so desired, a box or similar type structure having a height comparable to that of the display 10 can be placed behind the display 10, so as to effectively give the display 10 more depth. Such added depth may be desired by some during the positioning process if the particular display 10 being measured is narrow in depth, such as the case with an LCD or flat panel. Note, however, that the present invention does not require such added depth. In such cases, the cable 30 and slidable weight 40 can simply be draped over the narrow depth and hung or otherwise set to provide the necessary tension force to hold the colorimeter 20 in position on the target side of the display 10.

The electronics of colorimeter 20 can be implemented in conventional technology. In one particular embodiment, the colorimeter 20 is implemented as described in U.S. Pat. No. 5,892,585, which is herein incorporated by reference in its entirety. This patent describes example software, firmware, and circuit functions. It will be appreciated, however, that a number of hardware configurations, as well as software and firmware routines can be used to achieve optimum colorimeter performance. Measurements made by the colorimeter 20 may include, for example, luminance, chromaticity, as well as other parameters.

Cable 30 is a flexible electrical cable having a number of inner conductors required for carrying the power and electrical signals needed to perform desired colorimetry measurements. The type and length of the cable can be varied depending on the application. In one particular embodiment, cable 30 is a standard USB cable that is about six feet long (from colorimeter 20 housing to the end of connector 35), where host connector 35 is a conventional USB-male connector. Many configurations are possible here. Example gauges for the conductors within cable 30 are 26 or 28 AWG. The outer insulation can be, for example, PVC, rubber, or other flexible insulation. A spiral or braided shield is provided to improve electrical performance.

Generally stated, the configuration of cable 30 (e.g., gauge of conductors, insulation-type, and shielding) should be selected to operate in conjunction with the weight of the colorimeter 20, thereby providing sufficient flexibility so as to allow for ease in placement of the colorimeter 20, but without providing over-rigidness or otherwise undesirable force that may act to move the colorimeter after placement is selected. In this sense, the cable should be flexible enough such that it does not dictate colorimeter positioning. Rather, the user sets the colorimeter position by manipulating the arrangement of the colorimeter 20 and cable 30, and the cable 30 is compliant. It will be appreciated that greater flexibility in cable 30 can be achieved with lighter gauge conductors, shielding, and/or insulation. Factors such as data rate, power requirements, and standards-based requirements can be considered when selecting or otherwise configuring the flexible cable 30.

Figure 2:
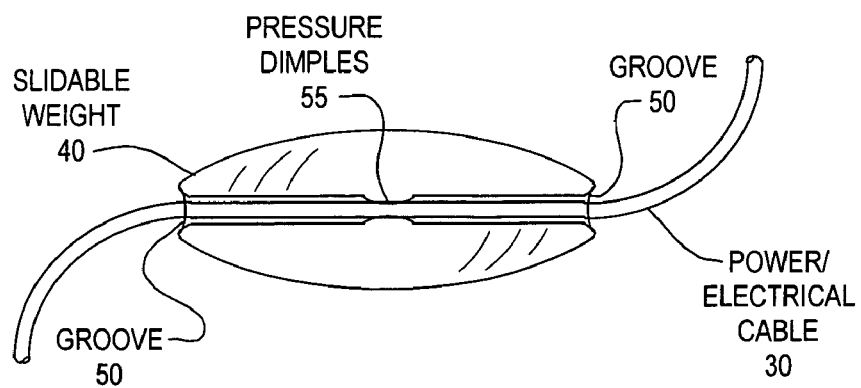
FIG. 2 illustrates a more detailed view of the slidable weight shown in FIG. 1.

FIG. 2 illustrates a more detailed view of the slidable weight shown in FIG. 1. In this example, the slidable weight 40 is oval-shaped and has a groove 50 running across its length. The width and depth of the groove 50 is configured to slidably receive the thickness of cable 30. In addition, a pair of pressure dimples 55 in the middle of the groove operate to snug the weight 40 to the cable 30, while still allowing the weight to slide given a small amount of sliding pressure by a user. In this way, the slidable weight 40 can be moved to a desired position on the cable 30, but will remain in that position until it is forcibly moved again.

In one particular embodiment, the slidable weight 40 is made of lead, having a weight of about 50 to 60 grams. Other slidable weight configurations will be apparent in light of this disclosure, and the actual weight and shape of weight 40 can be varied to suit the particulars of a given application. In general, positioning the slidable weight 40 on the cable 30 should provide a holding force to the weight of the colorimeter, thereby allowing the assembly to be draped over the top of the display. Alternatives to a slidable metal weight might include, for example, a sand bag that the user can selectively use to firmly sandwich the cable 30 between the bag and a surface of the monitor being measured or other proximate surface. Note that the sand bag could also be slidably attached to the cable 30 if so desired.

Figure 3:
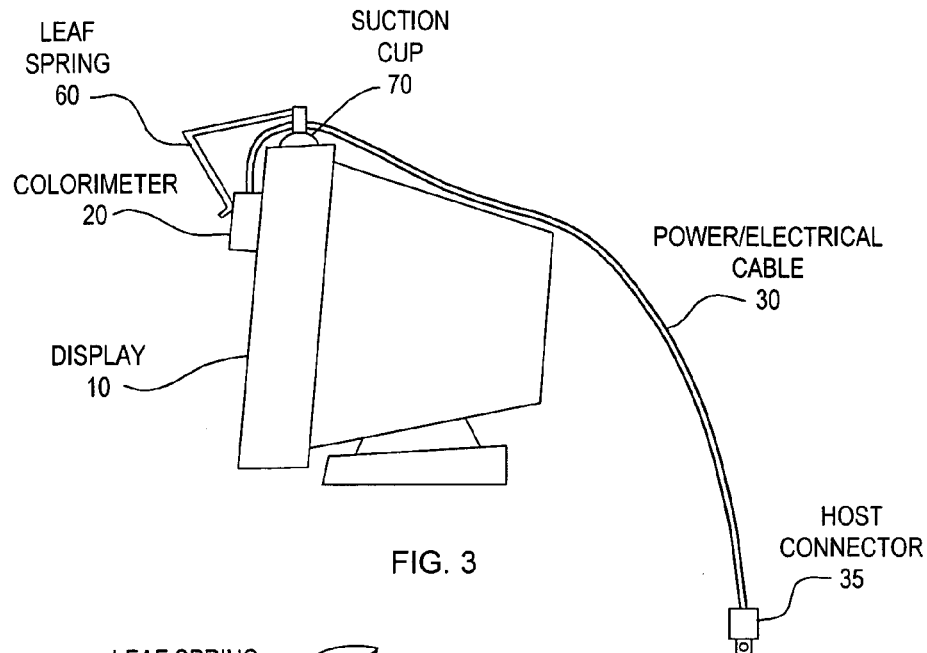
FIG. 3 is a side view of a colorimeter configured with a single cable, low impact mounting system in accordance with another embodiment of the present invention.

FIG. 3 is a side view of a colorimeter configured with a single cable, low impact mounting system in accordance with another embodiment of the present invention. Here, a suction cup 70 is used to secure the cable 30 in position once the colorimeter 20 is placed in its desired position. The suction cup 70 can fasten, for example, to the top surface of the target monitor being measured or to some other suitable surface proximate the target screen.

This particular embodiment also includes a leaf spring 60 which can be used to maximize the integrity of the mating of the colorimeter and the screen, thereby maintaining proper geometric requirements. The leaf spring 60 is a flexible but resilient piece of metal (e.g., 1 mm copper, aluminum, or piano wire) or plastic (e.g., 1 mm injection molded ABS/PC plastic) shaped so as to apply a slight bias force to the backside of the colorimeter 20, thereby ensuring the colorimeter lays flush to the target screen in the presence of vibrations or other disruptive conditions and anomalies. Note, however, that the present invention does not require use of the leaf spring 60, and is not intended to be limited to such a configuration.

Figure 4A:
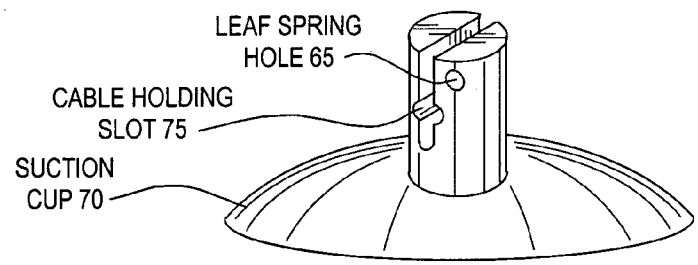
FIG. 4a illustrates a more detailed view of the suction cup shown in FIG. 3.

FIG. 4a illustrates a more detailed view of the suction cup shown in FIG. 3. As can be seen, this embodiment of suction cup 70 has a stem portion that includes a cable holding slot 75 and a leaf spring hole 65. The suction cup 70 can be fabricated of rubber or other suitable material, for example, using conventional pressure molding techniques. The suction cup 70 can be configured with a low displacement distance (distance between the cup's engaged-state and its relaxed-state) to minimize undesired movement of the colorimeter from its selected position, should the cup 70 develop a slow leak. The dimensional aspects of hole 65 and slot 75 can be set based on the configuration of the leaf spring 60 and cable 30, respectively. Numerous such configurations will be apparent in light of this disclosure.

Figure 4B:
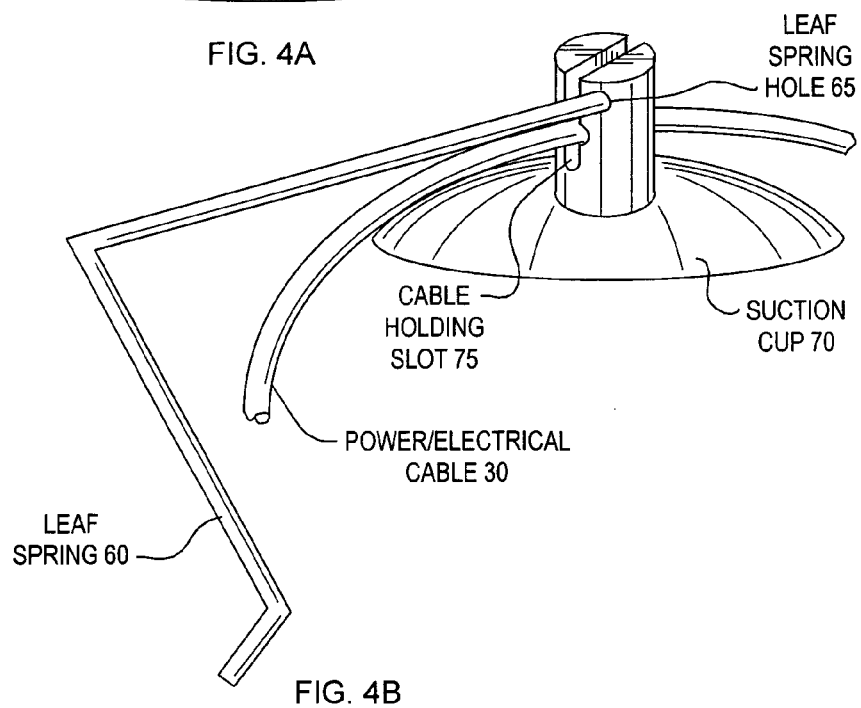
FIG. 4b illustrates a more detailed view of the interface between the suction cup, cable, and leaf spring shown in FIG. 3.

FIG. 4b illustrates a more detailed view of the interface between the suction cup, cable, and leaf spring shown in FIG. 3. In one particular application, the leaf spring 60 is installed after the colorimeter location is selected and the cable 30 is secured in the cable holding slot 75 (or by use of slidable weight 40). This allows the user to focus solely on installing the leaf spring if so desired. In such a case, the user could hold the colorimeter end of the spring 60 away from the assembly while inserting the other end of the spring 60 into the corresponding hole 65 of the deployed suction cup 70. Once the spring is engaged into the hole 65, the user can then gently position the "heeled" end of the spring 60 onto the backside of the colorimeter 20. Many leaf spring 60 configurations are possible here.

Numerous variations and combinations of features will be apparent in light of this disclosure. For example, the cable 30 can be further configured with a high friction outer surface to inhibit its natural movement due to settling after placement. Also, note that the slidable weight 40 can be used in conjunction with the suction cup 70 and leaf spring 60. In such an embodiment, the slidable weight 40 can be used to secure the cable 30 so that the colorimeter 20 bears flush against the screen in a consistent geometric orientation, while the suction cup can be used to hold the spring 60 in position against the backside of the colorimeter 20. Here, the suction cup 70 need not be configured to hold the cable 30, given the holding force associated with the slidable weight 40.

Suction Cup Array

Figure 5A:
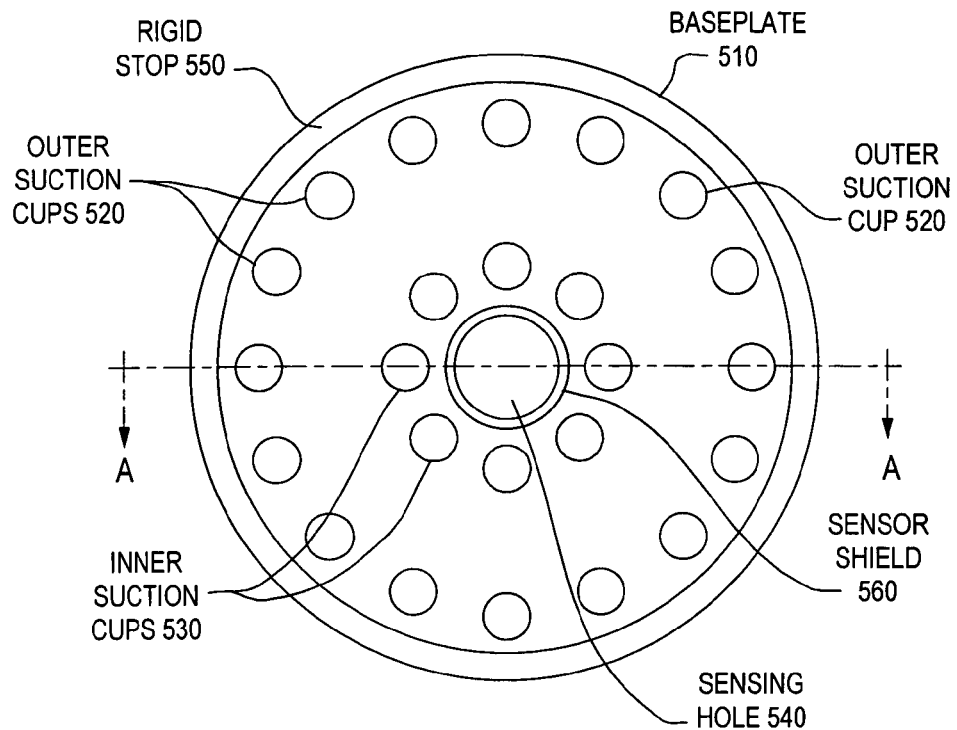
FIG. 5a is a bottom view of a colorimeter suction cup array that can be used in conjunction with the mounting system shown in FIGS. 1 and 3 in accordance with one embodiment of the present invention.
Figure 5B:
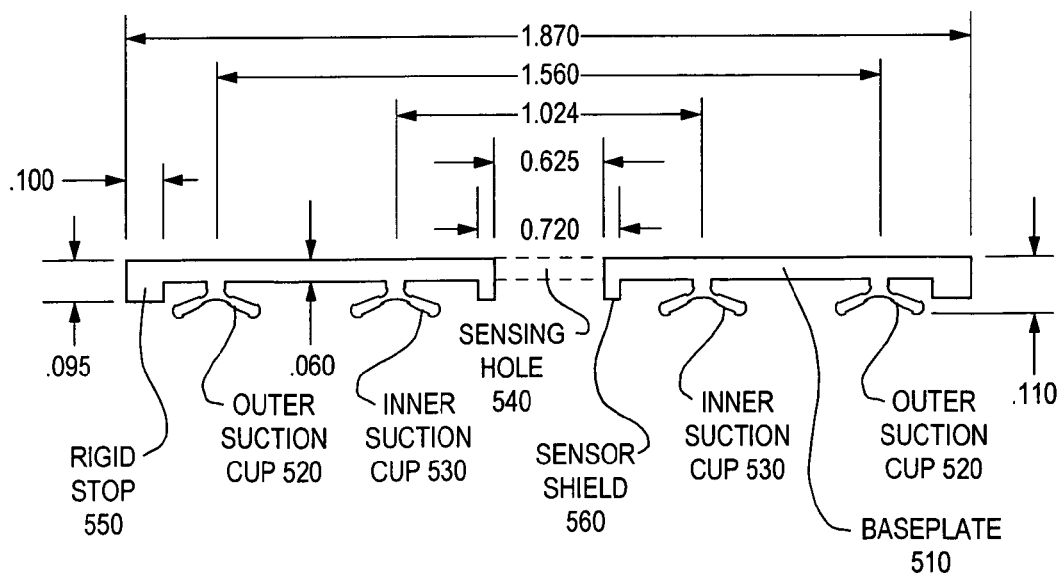

FIG. 5a is a bottom view of a colorimeter suction cup array that can he used in conjunction with the mounting system shown in FIGS. 1 and 3 in accordance with an embodiment of the present invention. FIG. 5b is a cross-section view of the suction cup array shown in FIG. 5a. Note that additional detailed description and embodiments of the suction cup array are provided in the previously incorporated U.S. application Ser. No. 10/684,853, titled "Sensor with Suction Cup Array Mount". In general, the suction cup array can be employed to hold the colorimeter in position on the target screen, and to control both the distance and variation of distance between the sensor and the screen, which improves SNR.

As can be seen, the mounting sub-system includes a baseplate 510, a set of outer suction cups 520, a set of inner suction cups 530, a sensing hole 540, a rigid stop 550, and a sensor shield 560. The baseplate 510 is configured with a suction cup array including a number of suction cups arranged in a desired pattern. In this case, the selected pattern includes a ring of outer suction cups 520 and a ring of inner suction cups 530. The baseplate 510 can be integrated or otherwise coupled to the screen side of the colorimeter 20 to further secure the selected position of the colorimeter, and to ensure accurate measurement parameters.

The sensing hole 540 is cut through the baseplate 510 and aligns to a sensing window of the colorimeter 20. The configuration (e.g., shape, location of sensing hole) of the baseplate 510 can generally be adapted to accommodate the colorimeter 20. In this case, the circular shape of the baseplate 510 and the inner and outer suction cup groups 520/530 can be attributed to a circular-shaped colorimeter 20. It will be apparent in light of this disclosure, however, that other shapes for the base plate and suction cup array pattern are possible.

In one particular embodiment, the entire array including the baseplate 510, the inner and outer suction cup groups 520/530, the rigid stop 550, and the sensor shield 560, are fabricated as a single molded piece of injection moldable elastomer or rubber. Here, the suction cup array can be integrally-molded or over-molded as part of the colorimeter 20 housing. Alternatively, the baseplate 510 can be a rigid piece of metal or plastic cut to an appropriate shape, and a suction cup array formed with the inner and outer suction cup groups 520/530, the rigid stop 550, and the sensor shield 560 can be a single injection molded construction of elastomer or rubber. This separately fabricated suction cup array can be coupled with the baseplate 510 using an adhesive or other suitable fastening mechanism. The combined assembly can then be fastened to the colorimeter 20 housing. Alternatively, the rigid baseplate 510 can be integral to the housing of the colorimeter, and the separately fabricated suction cup array can be coupled accordingly.

Material ALCRYN 2260 is one example of a thermoplastic elastomer that is injection moldable, and can be used to form the baseplate and or suction cup array. This rubber-like material blend is well suited to achieve low viscosity requirements during molding while supplying desired material properties. LOCTITE 401 and Prism primer are example adhesives that can be used to bond the suction cup array to a rigid support piece or colorimeter housing made from, for example, ABS/PC plastics. Note that the mounting subsystem can be integral to the colorimeter or other mountable device having similar mounting requirements.

In this example, the rigid stop 550 is a ring-shaped ridge disposed on the outer perimeter of the baseplate 510. The stop 550 helps to establish a pre-set distance of the colorimeter 20 to the target screen, and has its height set accordingly (so that the suction cups of the array can be fully seated). The stop 550 can be, for example, formed as an integral part of the suction cup array using injection-molding techniques as previously described. Alternatively, the stop 550 can be a separate part, such as a pre-formed rubber ring having suitable dimensions. This separate part can be operatively coupled to the array of suction cups using conventional bonding or attachment techniques. Note that the configuration of the stop 550 can vary. For example, the location of the stop 550 can be between the inner and outer suction cup rings. Alternatively, or in addition to, the stop 550 can be a series of shorter segments or a set of strategically placed posts rather than a continuous ring. Also, the shape of stop 550 can vary (e.g., rectangular or square). So long as the stop 550 operates to establish the distance of the mountable device to the target screen.

The sensor shield 560 is a ring-shaped ridge disposed on the outer perimeter of the sensing hole 540. The shield 560 operates to shield the sensors of colorimeter 20 from extraneous light generated by sources other than the target source being measured, and has a height substantially equal to or slightly taller than that of the stop 550. Note that the sensor shield 560 can be made more supple (e.g., because it is narrower) than the stop 550. This will allow for a seal to prevent extraneous light from entering the sensor area. This shielding feature aids sensors of colorimeter 20 in their ability to measure very small levels of light at high accuracy, since only light from the target is measured. The shield 560 can be, for example, formed as an integral part of the suction cup array using injection-molding techniques as previously described. Alternatively, the shield 560 can be a separate part, such as a pre-formed rubber ring having suitable dimensions. This separate part can be operatively coupled to the array of suction cups using conventional bonding or attachment techniques.

A suction cup array configured in accordance with the principles of the present invention provides many small cups for a more distributed and reliable suction. If one fails or leaks, many more still ensure proper distribution of the related forces with no overall failure. In addition, injection-molding a single piece provides many operable suction cups at the cost of one part. Also, because each cup of the array is small in diameter and not too deep, the movement (relative to a target surface) associated with transitioning from an engaged-state to a relaxed-state for any given cup is relatively short. Thus, even if the mounting system relaxes a bit, the change in mounting distance is short compared to conventional techniques that employ one to four larger suction cups.

The low removal force depends, for instance, on the rigidity of the design, and in particular, whether the suction cups of the array can be released at least semi-sequentially (assuming a flexible design allowing the mounting system to be peeled-off the target surface like a band-aid), or whether the suction cups of the array must be effectively released simultaneously (assuming a rigid design allowing the mounting system to be cantilevered off the target surface). In either case, a pull-tab can be used to facilitate removal.

The walls of each cup can generally be thin (e.g., 0.010 to 0.050 inches), and the cup stiffness can therefore be assumed negligible. Additional dimensional details of the suction cup array architecture will be discussed in more detail with reference to FIGS. 6a–b. All noted dimensions are in inches. It will be appreciated that the suction cup array configured in accordance with the principles of the present invention can have numerous dimensions, depending on the particulars of a given application, as will be apparent in light of this disclosure. The example dimensions are provided in the name of robust disclosure and to demonstrate one possible embodiment. However, the present invention is not intended to be limited to any one such configuration or embodiment.

In this particular embodiment, the outer ring of suction cups 520 includes eighteen evenly spaced cups on a 1.560 bolt circle, while the inner ring of suction cups 530 includes twelve evenly spaced cups on a 1.024 bolt circle. The outer diameter of each cup is about 0.240. The suction cup array, including suction cups 520 and 530, sensing hole 540, rigid stop 550 and sensing shield 560, is formed with injection molding techniques using a low viscosity thermoplastic elastomer blend of 96% ALCRYN 2250 UT with 4% ALCRYN 2260 BK by weight. The black color of the BK material renders the UT material nearly opaque. Note that other blends can be used here as well, or a non-blend, such as 100% ALCRYN 2250 UT, which would provide a transparent suction cup array.

The mold used to make the array has certain qualities that provide desired qualities of the formed array, and facilitate its fabrication. In particular, areas of the mold that correspond to flat, non-suction cup areas of the array are configured with a slightly rough EDM (electric discharge machining) finish. This allows the thermoplastic elastomer material to release from the mold. The mold areas that correspond to the inner bowl area of the suction cups are highly polished, which provides a smooth bowl surface. This assures good vacuum holding power. Additional features of the mold/tool are described in the previously incorporated "Sensor with Suction Cup Array Mount" U.S. patent application.

Figure 6A:
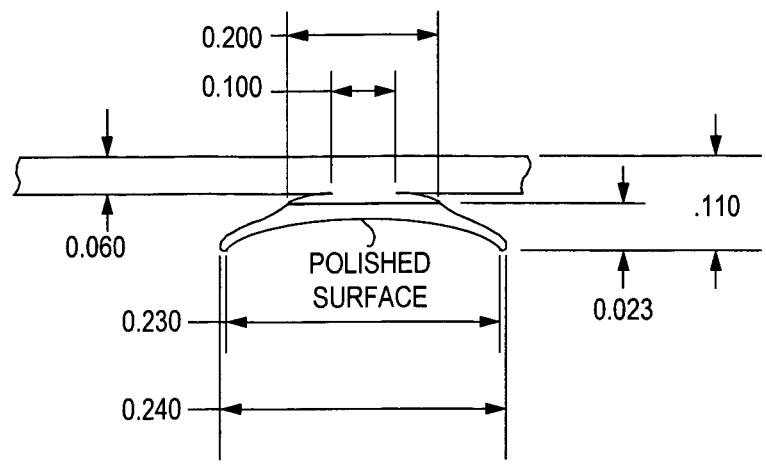
FIGS. 6a–b each illustrates dimensional details of the suction cups of an array configured in accordance with one embodiment of the present invention.
Figure 6B:
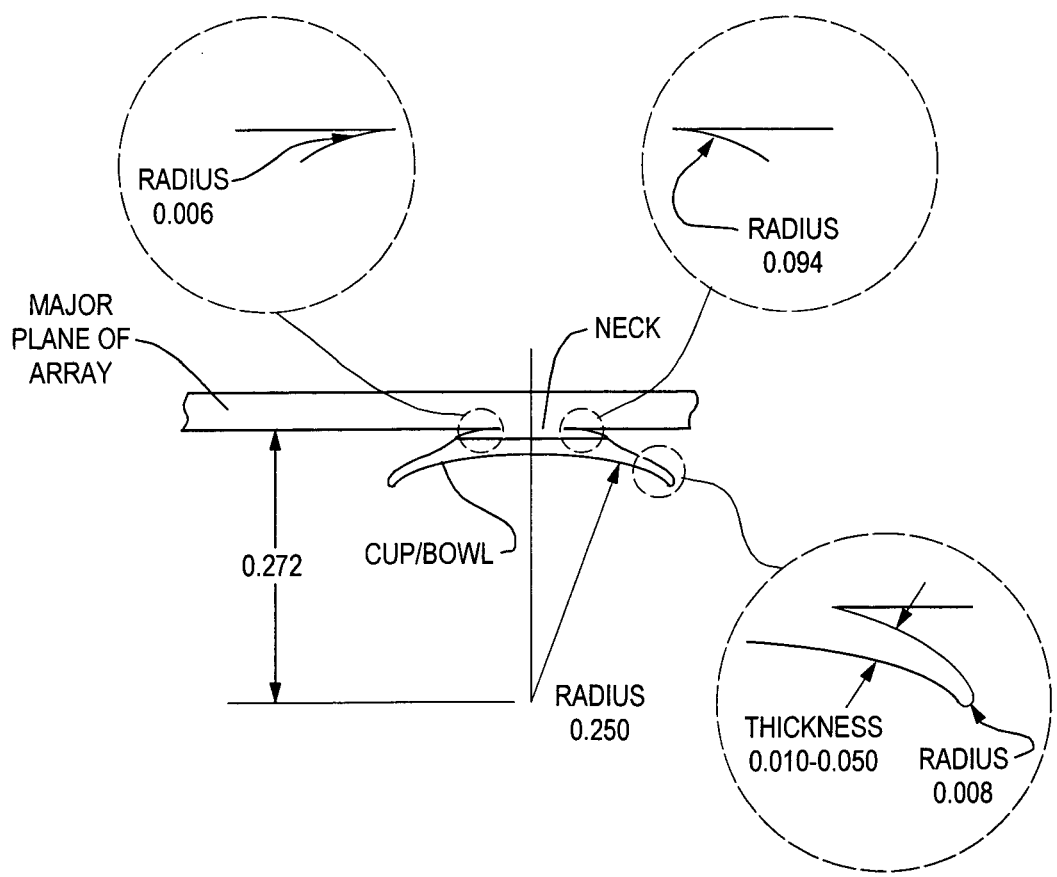

FIGS. 6a and 6b each show detailed views of a suction cup included in one embodiment of the array. The dimensions are drawn to illustrate various features, and are not drawn to scale. Note that the inner surface of the cup can be highly polished (based on the mold as previously discussed) to provide strong suction capability. Further note that the thickness of each cup can vary within a range, where the thinner wall section is at the widest diameter of the cup, and the thicker wall section is near the neck that couples the cup to the major plane of the array. Here, it can be seen that the formed array releases from the mold/tool by the cup features collapsing within the smallest cross-sectional area of part, which is the neck portion.

Each suction cup has an engaged-state (where the cup is fully seated), a relaxed-state (where the cup is not seated), and a displacement distance. The displacement distance is the distance the cup will move between when transitioning from the engaged-state to the relaxed-state. In accordance with the principles of the present invention, the suction cups of the array are configured to provide a short displacement distance, thereby enabling positional stability. In this particular example, the displacement distance is approximately 0.023 inches or less. The outer cup diameter here is 0.240 inches, and the inner cup diameter is about 0.230 inches. Other embodiments may have a different displacement distances and maximum diameters. An example range of displacement distances is from 0.015 to 0.115 inches, and a range of maximum cup diameter can be 0.250 or less. The goal here is to reduce or otherwise eliminate variation in the mounting distance relative to the target surface.

Improved SNR and FOV

FIG. 7 is an exploded view of colorimeter assembly having self-aligning optical qualities that yield a high SNR in accordance with an embodiment of the present invention. Note that additional detailed description and embodiments of the colorimeter assembly are provided in previously incorporated U.S. application Ser. No. 10/684.864, titled "Colorimeter with High SNR". One particular embodiment of the colorimeter assembly is configured with a viewing angle or field of view (FOV) in the range of +/−5 to 7 degrees. This FOV is near optimum for achieving the desired performance for the low cost colorimeter, and effectively matches the human eye field of view.

As can be seen, the assembly includes a sensor shield 705, a clamping screw 710, a clamping block 715, pin headers 720 and a corresponding PCB assembly 730, a number of sensors 725*a*–*b*, a sensor locating element 735, a number of filter stacks 740, and a tube block 745. Other components and features, such as a dust cover, cabling, and colorimeter circuitry, may also be included in the assembly as will be apparent in light of this disclosure.

The assembly procedure will be apparent from FIG. 7. Three filter stacks 740, each of which includes a glass layer 740*a* and three filter layers 740*b*–*d*, are placed in respective cavities of the tube block 745. Each cavity has a centrally located light passage that travels through the tube block 745 to allow intake of light from a target surface. The sensor locating element 735 is placed onto the tube block 745 via center guide pins to secure the filter stacks 740 in their cavities. The lead frame PCB assembly 730 is placed into position on the tube block 745 via a set of end guide pins. Three light-to-frequency sensors 725*a* and a light-to-voltage sensor 725*b* are placed in their respective positions, so that the lens of each sensor 725 is received into an lens alignment hole of the sensor locating element 735, thereby enabling filtered light to be received via the corresponding light passage. The clamping block 715 is placed over the sensors 725 via the guide pins of the tube block 745. The clamping screw 710 is torqued to secure the assembly. The sensor leads can then be soldered to the PCB assembly 730. Note that functional testing of the device can be performed before and/or after the soldering (assuming the unsoldered leads are in proper electrical contact). The sensor shield 705 can be installed over and/or around the clamping block 715 to prevent extraneous light from entering the back of the device, which reduces measurement accuracy. Also, a removable dust cover (not shown) can be coupled with the target surface side of the tube block 745 to protect the device until its use.

Each of the components and their respective features are discussed in detail in the previously incorporated "Colorimeter with High SNR" U.S. patent application. The tube block 745 can be a molded material having a low reflectance (e.g., black ABS/PC plastic), and effectively forms a base upon which the other componentry can be assembled. Note the four numbered filter stack cavities (1, 2, 3, and 4), and the light passage in each cavity. The filter stack cavities of tube block 745 are adapted to accommodate a variety of filter combinations within the filter stacks 740 to spectrally characterize each measurement channel.

Note that the embodiment shown in FIG. 7 has filter stacks 740 in three of the four cavities. The configuration provides three spectrally selective channels (over-lapping or non-overlapping depending on filter layers 740*b*–*d*), and a fourth voltage sensing channel (by virtue of sensor 725*b*). Further note the pair of tall center guide pins and the pair of shorter end guide pins.

The light passages in the numbered cavities of tube block 745 each have an orifice diameter on the target screen side block 745, and a length of each light passage to the corresponding stack cavity that is determined based on the orifice diameter to provide an optimal or otherwise desired field of view. Note that the diameter of the light passages corresponding to the sensors 725*a* are set to achieve the desired FOV, while the diameter of the light passage corresponding to the sensor 725*b* can be wider to ensure sufficient light is provided to sensor 725*b* to enable its proper function (converting light to voltage, in this embodiment).

The glass layer 740*a* of each slack can be, for example, a polished piece of blue/green infrared rejection filter glass. In one particular embodiment, the stack filter layers 740*b*–*d* are as follows: cavity number one—layer 740*b* is a rose filter, layer 740*c* is a Moroccan pink filter, and layer 740*d* is a medium amber filter; cavity number two—layer 740*b* is a green filter, layer 740*c* is a straw filter, and layer 740*d* is a yellow filter; cavity number three—layer 740b is a mikkel blue filter, layer 740*c* is a slate blue filter, and layer 740*d* is a lily filter. Note that there is no filter stack in cavity number four for this particular embodiment. It will be appreciated that any number of filters and stacks can be employed here, depending on the particular application.

This particular combination of sensors 725*a* and respective filter stacks 740 provide non-overlapping spectral responses (via three separate and distinct spectrally selective channels). These responses are adequate for providing data capable of translation into a standard coordinates system, such as CIE XYZ, CIE L* a* b*, or CIE Luv, as well as non-standard operable coordinate systems. Tri-stimulus colorimetric measurements applications are one such example. The number of spectrally selective channels can be varied depending on the particular application. In addition, other sensors types can be used to harvest other types of data, such as the light-to-voltage sensor 725*b*, which is used to determine voltage levels coming off of the target surface. Such information can be used to further characterize the object under test, such as its refresh rate or to provide a diagnostic voltage profile. Note that such a sensor type does not operate in conjunction with a filter stack.

The sensor locating element 735 is configured with lens alignment holes 735*a* for each light passage. Each lens alignment hole 735*a* is shaped so as to snugly receive the lens of the sensors 725. Also shown are two guide pin alignment holes 735*b*. These guide pin alignment holes correspond to the center guide pins of the tube block 745. This guide pin/alignment hole scheme enables a self-aligning fabrication process, thereby supporting high SNR performance.

The underside of the sensor locating element 735 may further include crushable ribs. In particular, once the colorimeter is assembled, the clamping screw 710 can be tightened, thereby causing the crushable ribs to deform against their respective filter stacks 740. Thus, an acceptable degree of force is applied to the stack to ensure its positional stability, without damaging the elements of the stack. The crushable ribs can be formed, for example, as a thin ring extending from the bottom of the sensor locating element 735 about each light passage. Other embodiments may have different crushable ribs, such as a plurality of crushable dots or ridges that extend from the bottom of the sensor locating element 735 proximate each light passage. Alternatively, the crushable ribs can be in the form of dashed lines or a semi-circle. Regardless of their shape, the crushable ribs can be molded or otherwise formed as an integral part of the sensor locating element 735. The crushable ribs mate with the glass layer 740a of each stack, and are of a determined compliance so as to accomplish sufficient clamping pressure without deforming the filter stack.

The upper side of the sensor locating element 735 can be shaped or otherwise customized to accommodate the packaging of the sensors 725. In one particular embodiment, sensors 725a are each a Texas Instruments TSL235 light-to-frequency converter, and sensor 725b is a Texas Instruments TSL250R light-to-voltage converter. These components have the same packaging. In this case, each of the four sensors has a bubble lens that is snugly received into a corresponding sensor alignment hole 735a. Also, a planar locating surface of each sensor 725 is placed flush on the planar area about the sensor alignment hole 735a of the sensor locating element 735, thereby aligning a plane of the target surface and a plane of the sensors. In addition, note that "bubble lens" or "bubble shaped lens" are intended to cover numerous protruding lens shapes, such as rounded, oval, square, triangular, rectangular, tube-like, or any shape that can contribute to a self-aligning fabrication process. It will be appreciated in light of this disclosure that other sensors types, shapes, and configurations can be used here as well.

As can be seen, the PCB assembly 730 has a pair of guide pin alignment holes and a number of lead holes. This further contributes to the self-aligning aspects achieved the fabrication process of the device. The alignment holes are adapted to be received by the end guide pins of the tube block 745. The lead holes are adapted to receive pin headers 720, which can be used to mate the overall assembly to a main assembly. In addition, the PCB assembly 730 can include a PCB circuit layout having conductor runs and contact points to support the colorimeter circuitry and related electronics (e.g., components, wirebonds, and cabling). In general, the lead frame PCB assembly 730 is designed so that it provides soldering points for electrically connecting the sensors 725a–b to the device electronics.

The clamping block 715 includes two guide pin alignment holes and a clamping screw hole. The alignment holes correspond to the center guide pins of the tube block 745, to further support the self-aligning qualities of the device. The clamping screw hole is counter-sunk and is adapted to receive the clamping screw 710. The underside of the clamping block 715 may further include a pressure bump for each sensor 725. The pressure bumps are adapted to apply clamping pressure to the back of the sensors 725 when the clamping screw 710 is torqued, or otherwise tightened in place.

In one particular embodiment, the back of each sensor 725 includes an inward dimple that is adapted to receive a corresponding pressure bump. As the clamping screw is tightened, each sensor floats until the corresponding pressure bump engages, aligns (by operation of the bump/dimple combination), and secures the sensor 725 in place. After the clamping operation (e.g., torquing screw 710 into position), the sensor 725 leads can be soldered to the lead frame PCB assembly 730.

Once the clamping process is complete, the sensor shield 705 can be added over the clamping block 715 and about the assembly to prevent extraneous light (light that is from sources other than the intended source) from entering the light passages on the target surface side of the tube block. In one embodiment, the sensor shield 705 is implemented with black electrical tape (e.g., 1½ inch wide, 8.5 mils thick). Variations on the shield will be apparent in light of this disclosure, such as a black rubber boot or other material that can shield extraneous light from the sensors 725. As previously explained, a dust cover can be fit over the target surface side of the tube block 745 to block entry of dust and other contaminants into the sensor 725 area.

Note that the clamping block 715 and the sensor locating element 735 can be fabricated in a similar fashion as the tube block 745 (e.g., a molded material having a low reflectance, such as black ABS/PC plastic). Further note that the overall assembly can be mated to a primary PCB which contains all ancillary circuits to accomplish colorimeter functions, such as spectral measurement, spectral translations to standard coordinate systems, integration of samples, determination of display type, timing, and other required functionality.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A screen mountable color sensing device for sensing light emitting from a target screen, the device comprising:
   a colorimeter configured with one or more light sensors and a field of view between each sensor and the target screen that simulates a human eye field of view;
   a flexible cable adapted to electrically connect the colorimeter to a host, and to suspend the colorimeter in a selected position on the target screen; and
   a slidable weight configured with a groove having pressure dimples therein to snugly but slidably couple to the cable, thereby allowing the slidable weight to be slid to a position on the cable so as to hold the colorimeter in the selected position on the target screen.

2. The device of claim 1 wherein each of the one or more light sensors is configured with a bubble shaped lens, and the colorimeter further comprises:
   a tube block having one or more filter cavities and corresponding light passages, and two or more alignment pins, thereby enabling a self-aligning fabrication process for the device; and
   a sensor locating element operatively coupled to the pins of the tube block, the sensor locating element having one or more lens alignment holes, each hole adapted to receive a corresponding one of the bubble shaped lenses, thereby aligning each sensor with a corresponding light passage of the tube block.

3. The device of claim 2 wherein the colorimeter further comprises:

one or more light filters, each filter placed in a corresponding one of the filter cavities, thereby providing one or more spectrally selective channels, with each spectrally selective channel designed to provide the field of view between each sensor and the target screen that simulates a human eye field of view.

4. The device of claim 3 wherein the one or more spectrally selective channels are non-overlapping, thereby enabling tri-stimulus measurements.

5. The device of claim 3 wherein each spectrally selective channel is designed to provide a field or view between each sensor and tile target screen in the range of +/−5 to 7 degrees.

6. The device of claim 2 wherein each of the one or more light sensors has a planar locating surface that mates with a surface about a corresponding one of the lens alignment holes of the sensor locating element, thereby aligning a plane of the target screen and a plane of the light sensors.

7. The device of claim 1 wherein the colorimeter further comprises:

an array of suction cups adapted to hold the colorimeter in position on the target screen, each cup in the array having a maximum displacement distance of 0.115 inches or less, thereby enabling positional stability of the colorimeter, the maximum displacement distance defining a distance any one cup will move in transitioning from a fully engaged-state to a fully relaxed-state; and one or more rigid stops located on the array, so as to establish a pre-set distance of the colorimeter to the target screen, each stop having a height that allows each of the suction cups to be fully seated.

8. The device of claim 7 wherein the array of suction cups further comprises:

a sensor hole located in the array, so as to allow the colorimeter to receive light emitted from the target screen; and a sensor shield located about the sensor hole, and adapted to shield the one or more light sensors from extraneous light generated by sources other than the target screen.

9. The device of claim 7 wherein the array of suction cups is formed using injection molding techniques and then operatively coupled to the colorimeter.

10. The device of claim 1 wherein the colorimeter has a target screen surface and a backside, the device further comprising:

a suction cup adapted for deployment proximate the target screen and to secure a leaf spring; and a leaf spring operatively coupled between the suction cup and the colorimeter, and adapted to provide a slight bias force to the backside of the colorimeter, thereby ensuring the target screen surface of the colorimeter lays flush to the target screen in the presence of disruptive conditions and anomalies.

11. The device of claim 1 wherein the colorimeter has one or more weights placed within its body, thereby causing the colorimeter to lay flush against the target screen.

12. A screen mountable color sensing device for sensing light emitting from a target screen, the device comprising:

a colorimeter configured with one or more sensors and a field of view between each sensor and the target screen that simulates a human eye field of view;

a flexible cable adapted to electrically connect the colorimeter to a host, and to suspend the colorimeter in a selected position on the target screen;

a suction cup adapted for deployment proximate the target screen and to secure the flexible cable so as to hold the colorimeter in the selected position on the target screen.

13. The device of claim 12 wherein the colorimeter has a target screen surface and a backside, and the suction cup is further adapted to secure a leaf spring, the device further comprising:

a leaf spring operatively coupled between the suction cup and the colorimeter, and adapted to provide a slight bias force to the backside of the colorimeter, thereby ensuring the target screen surface of the colorimeter lays flush to the target screen in the presence of disruptive conditions and anomalies.

14. The device of claim 12 wherein each of the one or more light sensors is configured with a bubble shaped lens, and the colorimeter further comprises:

a tube block having one or more filter cavities and corresponding light passages, and two or more alignment pins, thereby enabling a self-aligning fabrication process for the device; and a sensor locating element operatively coupled to the pins of the tube block, the sensor locating element having one or more lens alignment holes, each hole adapted to receive a corresponding one of the bubble shaped lenses, thereby aligning each sensor with a corresponding light passage of the tube block.

15. The device of claim 14 wherein the colorimeter further comprises:

one or more light filters, each filter placed in a corresponding one of the filter cavities, thereby providing one or more spectrally selective channels, with each spectrally selective channel designed to provide the field of view between each sensor and the target screen that simulates a human eye field of view.

16. The device of claim 15 wherein the one or more spectrally selective channels are non-overlapping, thereby enabling tri-stimulus measurements.

17. The device of claim 15 wherein each spectrally selective channel is designed to provide a field of view between each sensor and the target screen in the range of +/−5 to 7 degrees.

18. The device of claim 14 wherein each of the one or more light sensors has a planar locating surface that mates with a surface about a corresponding one of the lens alignment holes of the sensor locating element, thereby aligning a plane of the target screen and a plane of the light sensors.

19. The device of claim 12 wherein the colorimeter further comprises:

an array of suction cups adapted to hold the colorimeter in position on the target screen, each cup in the array having a maximum displacement distance of 0.115 inches or less, thereby enabling positional stability of the colorimeter, the maximum displacement distance defining a distance any one cup will move in transitioning from a fully engaged-state to a fully relaxed-state; and one or more rigid stops located on the array, so as to establish a pre-set distance of the colorimeter to the target screen, each stop having a height that allows each of the suction cups to be fully seated.

20. The device of claim 19 wherein the array of suction cups further comprises:
a sensor hole located in the array, so as to allow the colorimeter to receive light emitted from the target screen; and
a sensor shield located about the sensor hole, and adapted to shield the one or more light sensors from extraneous light generated by sources other than the target screen.

21. The device of claim 19 wherein the array of suction cups is formed using injection molding techniques and then operatively coupled to the colorimeter.

22. The device of claim 12 wherein the colorimeter has one or more weights placed within its body, thereby causing the colorimeter to lay flush against the target screen.

23. A screen mountable color sensing device for sensing light emitting from a target screen, the device comprising:
a colorimeter having a target screen surface and a backside;
a flexible cable adapted to electrically connect the colorimeter to a host, and to suspend the colorimeter in a selected position on the target screen;
a suction cup adapted for deployment proximate the target screen and to secure the flexible cable so as to hold the colorimeter in the selected position on the target screen; and
a leaf spring operatively coupled between the suction cup and the colorimeter, and adapted to provide a slight bias force to the backside of the colorimeter, thereby ensuring the target screen surface of the colorimeter lays flush to the target screen in the presence of disruptive conditions and anomalies.

24. The device of claim 23 wherein the colorimeter includes one or more light sensors each configured with a bubble shaped lens, and the colorimeter further comprises:
a tube block having one or more filter cavities and corresponding light passages, and two or more alignment pins, thereby enabling a self-aligning fabrication process for the device; and
a sensor locating element operatively coupled to the pins of the tube block, the sensor locating element having one or more lens alignment holes, each hole adapted to receive a corresponding one of the bubble shaped lenses, thereby aligning each sensor with a corresponding light passage of the tube block.

25. The device of claim 24 wherein the colorimeter further comprises:
one or more light filters, each filter placed in a corresponding one of the filter cavities, thereby providing one or more spectrally selective channels, with each spectrally selective channel designed to provide a field of view between each sensor and the target screen that simulates a human eye field of view.

26. The device of claim 24 wherein each of the one or more light sensors has a planar locating surface that mates with a surface about a corresponding one or the lens alignment holes of the sensor locating element, thereby aligning a plane of the target screen and a plane of the light sensors.

27. The device of claim 23 wherein the colorimeter further comprises:
an array of suction cups adapted to hold the colorimeter in position on the target screen, each cup in the array having a maximum displacement distance of 0.115 inches or less, thereby enabling positional stability of the colorimeter, the maximum displacement distance defining a distance any one cup will move in transitioning from a fully engaged-state to a fully relaxed-state; and
one or more rigid stops located on the array, so as to establish a pre-set distance of the colorimeter to the target screen, each stop having a height that allows each of the suction cups to be fully seated.

28. The device of claim 27 wherein the array of suction cups further comprises:
a sensor hole located in the array, so as to allow the colorimeter to receive light emitted from the target screen; and
a sensor shield located about the sensor hole, and adapted to shield one or more light sensors included in the colorimeter from extraneous light generated by sources other than the target screen.

29. The device of claim 23 wherein the colorimeter has one or more weights placed within its body, thereby causing the colorimeter to lay flush against the target screen.

30. A screen mountable color sensing device for sensing light emitting from a target screen, the device comprising:
a colorimeter having a target screen surface and a backside;
a flexible cable adapted to electrically connect the colorimeter to a host, and to suspend the colorimeter in a selected position on the target screen;
a slidable weight coupled to the cable and adapted to slide to a position on the cable so as to hold the colorimeter in the selected position on the target screen; and
a leaf spring adapted to provide a slight bias force to the backside of the colorimeter, thereby ensuring the target screen surface of the colorimeter lays flush to the target screen in the presence of disruptive conditions and anomalies.

31. The device of claim 30 further comprising:
a suction cup adapted for deployment proximate the target screen and to secure one end of the leaf spring.

32. The device of claim 30 wherein the colorimeter includes one or more light sensors each configured with a bubble shaped lens, and the colorimeter further comprises:
a tube block having one or more filter cavities and corresponding light passages, and two or more alignment pins, thereby enabling a self-aligning fabrication process for the device; and
a sensor locating element operatively coupled to the pins of the tube block, the sensor locating element having one or more lens alignment holes, each hole adapted to receive a corresponding one of the bubble shaped lenses, thereby aligning each sensor with a corresponding light passage of the tube block.

33. The device of claim 32 wherein the colorimeter further comprises:
one or more light filters, each filter placed in a corresponding one of the filter cavities, thereby providing one or more spectrally selective channels, with each spectrally selective channel designed to provide a field of view between each sensor and the target screen that simulates a human eye field of view.

34. The device of claim 30 wherein the colorimeter further comprises:
an array of suction cups adapted to hold the colorimeter in position on the target screen,
each cup in the array having a maximum displacement distance of 0.115 inches or less, thereby enabling positional stability of the colorimeter, the maximum displacement distance defining a distance any one cup will move in transitioning from a fully engaged-state to a fully relaxed-state; and one or more rigid stops located on the array, so as to establish a pre-set distance of the colorimeter to the target screen, each stop having a height that allows each of the suction cups to be fully seated.

35. The device of claim 34 wherein the ray of suction cups further comprises:

a sensor hole located in the array, so as to allow the colorimeter to receive light emitted from the target screen; and a sensor shield located about the sensor hole, and adapted to shield the one or more light sensors from extraneous light generated by sources other than the target screen.

36. The device of claim 30 wherein the colorimeter has one or more weights placed within its body, thereby causing the colorimeter to lay flush against the target screen.

* * * * *